6868X
I. Jennings,
Steam-Boiler Water-Tube.
Patented Dec. 21, 1831.
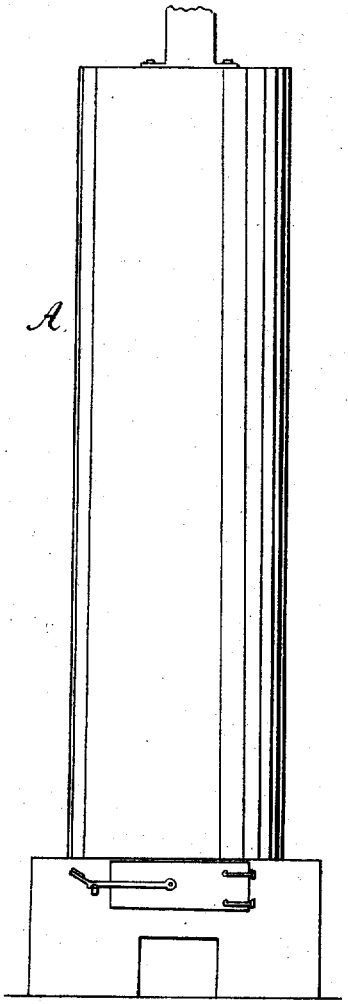
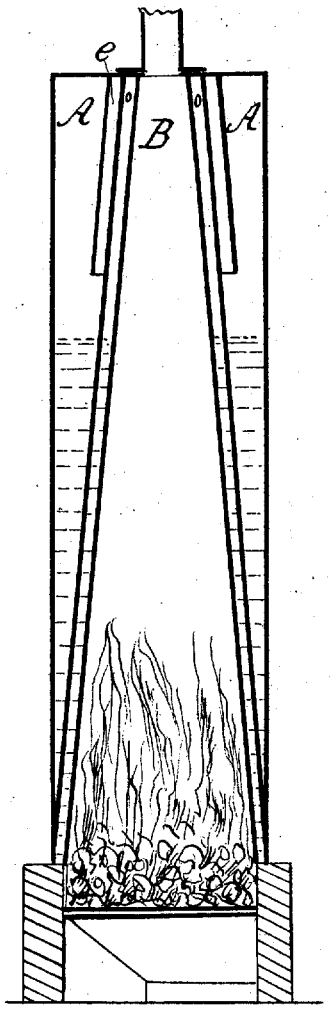
AM. PHOTO-LITHO. CO. N.Y. (OSBORNE'S PROCESS.)

[illegible]

Isaiah Jennings, of the City of N York. 6868X

Letters Patent

The schedule referred to in these Letters Patent, and making part of the same, containing a description in the words of the said Isaiah Jennings himself, of his improvement in the boilers of steam engines ——.

---

To all whom it may concern: Be it known that I, Isaiah Jennings, of the City of New York, have invented an improved mode of constructing boilers for steam engines, which improvement is particularly applicable to the boiler heretofore patented by me, but is also applicable to boilers of other construction The following is a full and exact description of the boiler as now constructed by me, not intending however to confine myself to any specific form or dimensions but only to render manifest the principle upon which I proceed.. I usually construct my boiler with the exterior form of a cylinder standing vertically. This cylinder may be about twelve feet long and three feet two inches in diameter. The interior of this boiler is in the form of a truncated cone, which will have the same length with the cylinder and may be about two feet ten inches in diameter at the bottom, and ten inches at the top. a second conical part is also provided of the same length with the former but two inches larger in diameter throughout. These three parts are to be firmly connected together both at top and at — bottom, and between them is the reservoir for water and steam and within them the fire and heated air pass. The top of the boiler to which the cylinder and cones are secured is perforated in the middle for a flue and has the requisite openings for a steam pipe, valves &c —

The larger cone is to be perforated with rows of holes at top and at bottom to open a free communication for water and for steam, between the exterior and interior spaces formed by the cones and cylinder. At the top these holes may amount to a dozen and half that number will suffice at the bottom. The row at the top may be within an inch of that [illegible] but those near the bottom had better be six inches from the lower end I make them usually about one eigth of an inch in diameter and to.

12/21/1831 6868X preserve them from corrosion and furring up I usually bush them with gold or platina - Besides the three parts above described I cause a truncated cone of sheet metal to descend from the top of the boiler, to the depth therein of about three feet allowing about the same space between it and the larger cone, as that between the two cones - By means of this, the steam which passes through the upper holes from the interior to the exterior space, is conducted down towards the surface of the water, which stands in the boiler at about two thirds of its height. Should a boiler of this description burst, the rent will always take place in the interior or smaller cone which is exposed to the fire and nowhere else. When such a rent does take place no more water or steam can be suddenly discharged than that which is contained within the inner space which upon fair and repeated trial, has not been productive of the slightest personal injury. The smallness of the holes establishing a communication between the two chambers pre-venting any rapid discharge of the great body of water -

What I claim as new in the present arrangement is the combining togeth-er of the three metallic vessels so as to form two interior spaces or chambers for water and for steam and the establishing a communication between these spaces in the manner and for the purposes herein described intending to apply the same principle to such boilers now in use as will admit thereof although they may differ greatly in form from that described. I also claim as new and as my invention the bushing of the holes with metals not liable to corrosion -

Witnesses
A. B. Spotswood
George Tadsby

Isaiah Jennings

[142